Patented Sept. 14, 1948

2,449,142

UNITED STATES PATENT OFFICE 2,449,142

METHOD FOR IMPROVING THE YIELD OF RIBOFLAVIN IN FERMENTATION PROCESSES

Henry L. Pollard, Nelson E. Rodgers, and Reginald E. Meade, Appleton, Wis., assignors to Western Condensing Company, San Francisco, Calif., a corporation of California No Drawing. Application December 1, 1944, Serial No. 566,247

4 Claims. (Cl. 195—42)

1

This invention relates to processes for the manufacture of biologically active materials such as vitamins by fermentation processes. More particularly, the invention pertains to the synthesis, from lactose-containing products (in particular, lacteal material), of riboflavin and other vitamins by the action of bacteria, and, specifically, by the action of the bacterium *Clostridium acetobutylicum*.

The present application is a continuation-in-part of the application Serial No. 439,310, filed April 17, 1942, by Henry L. Pollard, Nelson E. Rodgers and Reginald E. Meade entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of *Clostridium acetobutylicum*. Such a fermentation synthesis of riboflavin is accompanied by the formation of neutral solvents such as ethanol, acetone and butanol, and gases such as hydrogen and carbon dioxide, which can be recovered as valuable by-products.

To prepare a lactose-containing lacteal medium such as whey or skim milk for fermentation to increase its riboflavin content, it is sterilized completely or substantially completely, as by heat treatment at about 250° F. for about 10 to 20 minutes. In addition, the acidity of the lacteal medium is neutralized preferably to a pH of 6 to 7 by adding an alkaline reagent such as sodium, potassium or calcium hydroxide. Calcium carbonate may be added to enhance riboflavin production. The iron content of the lacteal medium preferably is adjusted to the range of from 0.5 to less than 4.5 parts per million. In this connection it should be noted that the natural iron content of uncontaminated whey or skim milk will range from 0.10 to 0.21 part per million, while the iron content of whey contaminated, as by corrosive contact with iron containers, may reach a value above 4.5 parts per million. In the case of uncontaminated whey, the iron content may be increased by incorporation of suitable amounts of a soluble ferrous salt such as ferrous sulfate, while whey containing too much iron may be diluted with uncontaminated whey.

The thus prepared material, cooled to a temperature of about 100° F., is placed in a fermenting container and inoculated with *Clostridium acetobutylicum* (such as described by McCoy, Peterson and Hastings in "Journal of Infectious Diseases," Volume 39, page 457) preferably at a temperature about 100° F. under conditions such as will prevent the introduction of iron and contaminating organisms. A suitable inoculum may be prepared from a stock culture by repeated transfers in a nutrient medium such as whey.

In general, fermentation of a batch of whey can continue for from twelve to forty-eight hours, or until there is no noticeable further increase in the riboflavin content.

The gases formed during fermentation can be vented from the fermenting tank, as formed. The solvents formed during fermentation can be removed by fractional distillation, and after removing volatile products the fermented material can be concentrated by evaporation to produce a concentrated liquor. If desired, this liquid can be further subjected to drying to produce a powdered product. If desired, instead of separately fractionating the solvents, they can be condensed from the vapors evolved during concentration of the fermented material by evaporation to form a water-solvent mixture from which the solvents can be removed by fractional distillation.

At some point after fermentation, it is desirable to inhibit further bacterial action, as for example by heat sterilization applied as a separate step or in conjunction with concentration by evaporation.

The product obtained by the above procedure is a concentrate which can be further refined or blended with various food materials for human or animal consumption. By use of the process described hereinabove, the riboflavin content of whey has been increased from about 1.4 to 70 micrograms per milliliter (before concentration), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients which are used to advantage when the product is blended with other material, such as various milk products, bread and bakery products, poultry and animal feeds, and the like.

The present invention relates particularly to the addition of soluble zinc salts to a lactose-containing material to be used in a fermentation process such as that described hereinabove.

Lacteal media such as uncontaminated whey ordinarily contains zinc in amounts ranging from 0.08 to 0.48 part per million as determined polarographically. We have now found that increased riboflavin yields can be obtained by maintaining in such lacteal media a zinc content of from about 0.15 to about 3.5 parts per million.

It is therefore an important object of the present invention to provide an improved method for synthesizing riboflavin from whey or the like by fermentation with *Clostridium acetobutylicum.*

Another important object of the present invention is to provide a process of the nature indicated including incorporating a soluble zinc salt with whey or other lactose-containing medium.

Other and further objects and features of the present invention will become apparent from the following description and appended claims.

In proceeding according to the present invention, the directions given hereinabove as applying to the method of the copending application are followed, except for variations disclosed hereinbelow.

Since the zinc content of available lacteal media, such as whey, varies considerably, the medium may be assayed for zinc polarographically before fermentation. A sufficient amount of a soluble zinc salt is then added to adjust the zinc content of the whey to between 0.15 and 3.5 parts per million. If necessary, a sufficient amount of a soluble ferrous salt is added to insure a total iron content of at least 1.10 parts per million.

The type of results obtained when proceeding according to the present invention are illustrated by an experiment described hereinbelow.

The basal medium used in this experiment was rennet whey supplemented with 10 parts per million para-aminobenzoic acid and 0.2% calcium carbonate. The activity of zinc as zinc sulfate was tested in the presence of different concentrations of iron added as ferrous sulfate, as indicated in the accompanying table. The variously supplemented media were autoclaved in 100 milliliter volumes, inoculated with 4% of a suitable *Clostridium acetobutylicum* starter and incubated at 100° F. for 48 hours. The riboflavin yields in duplicate cultures are shown in the following table:

| Zn parts per million | | Riboflavin µg./ml., added Fe in parts per million | | | | | | |
|---|---|---|---|---|---|---|---|---|
| Added | Total | 0.56 | 0.84 | 1.12 | 1.40 | 1.68 | 2.24 | 3.36 |
| 0 | 0.08 | 22 | 45 | 44 | 34 | 28 | 17 | 3.3 |
|  |  | 22 | 44 | 41 | 26 | 27 | 13 | 2.7 |
| 0.16 | 0.24 | 17 | 31 | 46 | 46 | 42 | 30 | 10 |
|  |  | 14 | 31 | 51 | 44 | 41 | 28 | 12 |
| 0.33 | 0.41 | 12 | 26 | 45 | 52 | 49 | 37 | 15 |
|  |  | 13 | 27 | 51 | 51 | 49 | 39 | 15 |
| 0.65 | 0.73 | 19 | 40 | 50 | 57 | 52 | 42 | 21 |
|  |  | 20 | 40 | 55 | 56 | 53 | 41 | 20 |
| 1.64 | 1.72 | 13 | 45 | 56 | 52 | 49 | 38 | 16 |
|  |  | 12 | 47 | 55 | 52 | 48 | 37 | 17 |
| 3.27 | 3.35 | 15 | 37 | 49 | 53 | 49 | 40 | 16 |
|  |  | 12 | 34 | 46 | 53 | 51 | 40 | 20 |

These data show that the riboflavin yields were increased when zinc sulfate was added to whey containing at least one part per million added iron. At lower iron concentrations, zinc tended to inhibit the synthesis of riboflavin.

The above examples have been given solely as illustrative of the application of the methods of this invention to the synthesis of riboflavin from lacteal or other lactose-containing liquids. A number of experiments of this general type form the basis for the claimed methods. Isolated experiments may show minor deviations from the claimed ranges, but in a series of experiments consistently good average yields of riboflavin may be obtained by maintaining the claimed limits.

In the foregoing, particular reference has been made to the synthesis of riboflavin. It is to be understood, however, that other nutritive materials or vitamins may be synthesized in addition to riboflavin.

Many details of composition and procedure may be varied within a wide range without departing from the principles of this invention and it is therefore not our purpose to limit the scope of the patent granted on this invention otherwise than necessitated by the scope of the appended claims.

We claim as our invention:

1. In a process of manufacturing a vitamin concentrate including riboflavin by fermenting a lactose-containing lacteal material with *Clostridium acetobutylicum* in the presence of a soluble iron compound, the improvement comprising incorporating with said material from 0.15 to 3.5 parts per million of zinc in the form of a soluble zinc salt and maintaining in said material an iron concentration of from 1.10 to less than 4.5 parts per million.

2. In a process of manufacturing a vitamin concentrate including riboflavin by fermenting heat sterilized whey with *Clostridium acetobutylicum* in the presence of a soluble iron compound, the improvement which comprises prior to sterilization incorporating with said whey from 0.15 to 3.5 parts per million of zinc in the form of a soluble zinc salt and maintaining in said whey an iron concentration of from 1.10 to less than 4.5 parts per million.

3. In a process of manufacturing a vitamin concentrate including riboflavin by fermenting heat sterilized whey with *Clostridium acetobutylicum* in the presence of a soluble iron compound, the improvement which comprises prior to sterilization incorporating with said whey from 0.15 to 3.5 parts per million of zinc in the form of zinc sulfate and maintaining in said whey an iron concentration of from 1.10 to less than 4.5 parts per million.

4. In the process of manufacturing riboflavin by fermenting whey with *Clostridium acetobutylicum*, the improvement of carrying out the fermentation in the presence of available zinc and of at least 1.10 parts to less than 4.5 parts per million of a soluble iron compound, and regulating the zinc concentration to lie within the range from about 0.15 to about 3.5 parts per million.

HENRY L. POLLARD.
NELSON E. RODGERS.
REGINALD E. MEADE.

REFERENCES CITED

The following references are of record in the file of this patent:

UNITED STATES PATENTS

| Number | Name | Date |
|---|---|---|
| 2,089,562 | Legg | Aug. 10, 1937 |
| 2,202,161 | Miner | May 28, 1940 |
| 2,297,671 | Yamasaki | Sept. 29, 1942 |
| 2,326,425 | Arzberger | Aug. 10, 1943 |
| 2,369,680 | Meade et al. | Feb. 20, 1945 |

OTHER REFERENCES

Winton, Structure and Composition of Foods (1937), vol. III, page 143.